(12) United States Patent
Motohashi

(10) Patent No.: US 8,752,792 B2
(45) Date of Patent: Jun. 17, 2014

(54) CLOSING MEMBER FOR OPENING

(75) Inventor: Hideto Motohashi, Aichi (JP)

(73) Assignee: Mitubishi Aircarft Corporation, Aichi (JP)

( * ) Notice: Subject to any disclaimer, the term of this patent is extended or adjusted under 35 U.S.C. 154(b) by 0 days.

(21) Appl. No.: 13/577,754

(22) PCT Filed: Feb. 9, 2011

(86) PCT No.: PCT/JP2011/000712
§ 371 (c)(1),
(2), (4) Date: Sep. 14, 2012

(87) PCT Pub. No.: WO2011/099274
PCT Pub. Date: Aug. 18, 2011

(65) Prior Publication Data
US 2012/0325967 A1     Dec. 27, 2012

(30) Foreign Application Priority Data
Feb. 10, 2010 (JP) ................. 2010-027672

(51) Int. Cl.
B64C 1/14 (2006.01)
B64D 45/02 (2006.01)
B64C 3/34 (2006.01)
B64D 37/32 (2006.01)

(52) U.S. Cl.
CPC . *B64C 3/34* (2013.01); *B64D 45/02* (2013.01); *B64D 37/32* (2013.01)
USPC .................................................. 244/129.4

(58) Field of Classification Search
USPC ............... 244/119, 129.3–129.5; 52/784.1, 52/784.13, 784.15, 717.01
See application file for complete search history.

(56) References Cited

U.S. PATENT DOCUMENTS

| 4,428,867 A | 1/1984 | Billias et al. |
| 4,530,443 A | 7/1985 | Gorges |
| 4,579,248 A * | 4/1986 | Gorges ........................ 220/327 |
| 8,443,575 B1 * | 5/2013 | Tanner et al. ................. 52/784.1 |
| 2007/0207421 A1 | 9/2007 | Heeter |

FOREIGN PATENT DOCUMENTS

| JP | 2002-528278 A | 9/2002 |
| WO | 2009-003954 A1 | 1/2009 |

OTHER PUBLICATIONS

International Preliminary Report on Patentability for PCT/JP2011/000712; Feb. 9, 2011.
Niu, M.C-Y. "Airframe Structural Design: Practical Design Information and Data on Aircraft Structures." Conmilit Press Ltd., Hong Kong; 1988; p. 265, Fig. 8.3.16 (XP009158193).
International Search Report for PCT/JP2011/000712; Mar. 22, 2011.

* cited by examiner

*Primary Examiner* — Philip J Bonzell
(74) *Attorney, Agent, or Firm* — Pearne & Gordon LLP

(57) ABSTRACT

An object of the invention is to provide a low-cost closing member for an opening having an excellent lightning protection capability.
A door body 30, a clamp ring 40 made of a composite material, and an opening 12 of a wing panel 11 made of the composite material are electrically connected by surface bonding of conductive materials in a butt section of an abutment surface 34 of the door body 30 and a tapered surface 40c of the clamp ring 40 and a butt section of a tapered surface 40d of the clamp ring 40 and an abutment surface 14 of the opening 12.

8 Claims, 3 Drawing Sheets

CLOSING MEMBER FOR OPENING

TECHNICAL FIELD

The present invention relates to a closing member for an opening provided in an airframe of an aircraft.

BACKGROUND ART

Wing panels constituting wing surfaces are mounted above and below beam members, thereby assembling a main wing of the aircraft into a hollow structure. Generally an internal space of the main wing is used as a fuel tank.

An opening is formed in the surface of the main wing in order to perform inspection, maintenance and the like of an inside of the fuel tank. The opening is normally closed by an access door, and the access door is opened in performing the inspection, maintenance and the like (for example, see Non-Patent Document 1).

The access door includes a door body that is disposed on an internal space side of the main wing with respect to the opening and a clamp ring that is disposed on an external side of the main wing with respect to the opening.

Each of the door body and the clamp ring has an external dimension larger than that of the opening. The door body and the clamp ring are tightened by a fastener member and the like while an edge portion of the opening is held between an outer circumferential portion of the door body and an outer circumferential portion of the clamp ring, whereby the opening is closed by the door body.

CITATION LIST

Non-Patent Document

Non-Patent Document 1: "Airframe Structural Design", Michael C. Y. Niu, Conmilit Press Ltd., Hong Kong, 1988, p. 265, Fig. 8.3.16

SUMMARY OF THE INVENTION

Technical Problems to be Solved by the Invention

In recent years, there has been studied use of a composite material including a carbon fiber, for the main wing of the aircraft. In the case that the main wing is made of the conventional metallic material, even if lightning strikes the access door, a lightning current is passed from the access door to the wing panel of the main wing to diffuse. However, in the case that the main wing is made of the composite material, when the lightning strikes the access door directly, the current hardly diffuses, and possibly an arc discharge is generated in an outer circumferential portion of the access door. Therefore, it is necessary to securely take a countermeasure against the lightning.

A small amount of current is passed through the composite material including the carbon fiber. In order to prevent electric isolation of the access door it is necessary to establish electrical bonding between the access door and the wing panel irrespective of a kind of the material for the access door.

In the case that the airframe of the aircraft is made of the carbon fiber composite material, when the electrical bonding is tried to be established at a contact surface in order to avoid galvanic corrosion at the contact surface, the materials for the door body and the clamp ring are restricted to an titanium alloy, CRES (stainless alloy), and the like, which are considered as the metal of similar electrode potential as the carbon fiber composite material. However, unfortunately both the titanium alloy and CRES (stainless alloy) are a hardly-machinable material, the titanium alloy is expensive, and CRES has high specific gravity to lead to an increase in weight.

These problems are common to other openings provided in the airframe of the aircraft.

The invention has been devised in view of the above technical problems, and an object of the invention is to provide a closing member for an opening with an excellent lightning protection capability.

Solution to the Problems

In order to achieve the above object, the present invention provides a closing member for an opening that is formed in a panel constituting an outer surface of an airframe of an aircraft and being made of a composite material including a carbon fiber, the closing member including: a closing member body that is disposed on one surface side of the panel to close the opening, at least a side thereof that is to be located on an outward of the airframe being made of one of titanium alloy, a stainless alloy, and a composite material including a carbon fiber, the closing member body having an external diameter larger than that of the opening; a ring-shaped clamp member that is disposed on the other surface side of the panel, at least a side thereof that is located on an outward of the airframe being made of the composite material including the carbon fiber, the clamp member having an external diameter larger than that of the opening; and a fastener that tightens the closing member body and the clamp member while the panel is held between an outer circumferential portion of the closing member body and an outer circumferential portion of the clamp member, wherein the closing member body and an inner circumferential portion of the clamp member abut on each other, and the outer circumferential portion of the clamp member and an inner edge portion of the opening abut on each other, whereby the closing member is electrically connected to the panel through the clamp member.

As described above, the current can be passed to the panel in the surrounding area of the opening through the carbon fiber constituting the clamp member in the case that the lightning strikes the closing member body directly.

In the clamp member, if the section that contacts the panel constituting the outer surface of the airframe is made of the same carbon fiber composite material as that of the panel, the electrical bonding can be ensured lower in cost and lighter in weight compared with the use of the metal, such as titanium and CRES, which has the similar electrode potential as the carbon fiber composite material.

Preferably an abutment surface of the closing member body and the inner circumferential portion of the clamp member and an abutment surface of the outer circumferential portion of the clamp member and the inner edge portion of the opening constitute a tapered surface that is tilted with respect to a direction orthogonal to the airframe surface. Thereby, cut surfaces of the carbon fibers can be butted with each other to securely establish the electrical bonding.

In the clamp member, the surface that is to be located on the outward of the airframe may be made of the composite material including the carbon fiber while a surface facing an inward of the airframe may be made of a metallic material.

The opening in which the closing member is provided may be used for any application and any configuration. Because the generation of the arc discharge can be prevented, preferably the opening is provided in the main wing constituting the airframe, and the opening is an access to a fuel tank accommodated in the main wing.

Advantageous Effect of the Invention

According to the invention, in the case that the lightning strikes the closing member directly, the current can be passed to the panel in the surrounding area of the opening through the carbon fiber constituting the clamp member. As a result, the closing member having an excellent lightning protection capability can be obtained.

DESCRIPTION OF EMBODIMENTS

Hereinafter, an embodiment of the invention will be described in detail with reference to the accompanying drawings.

Figure 1:
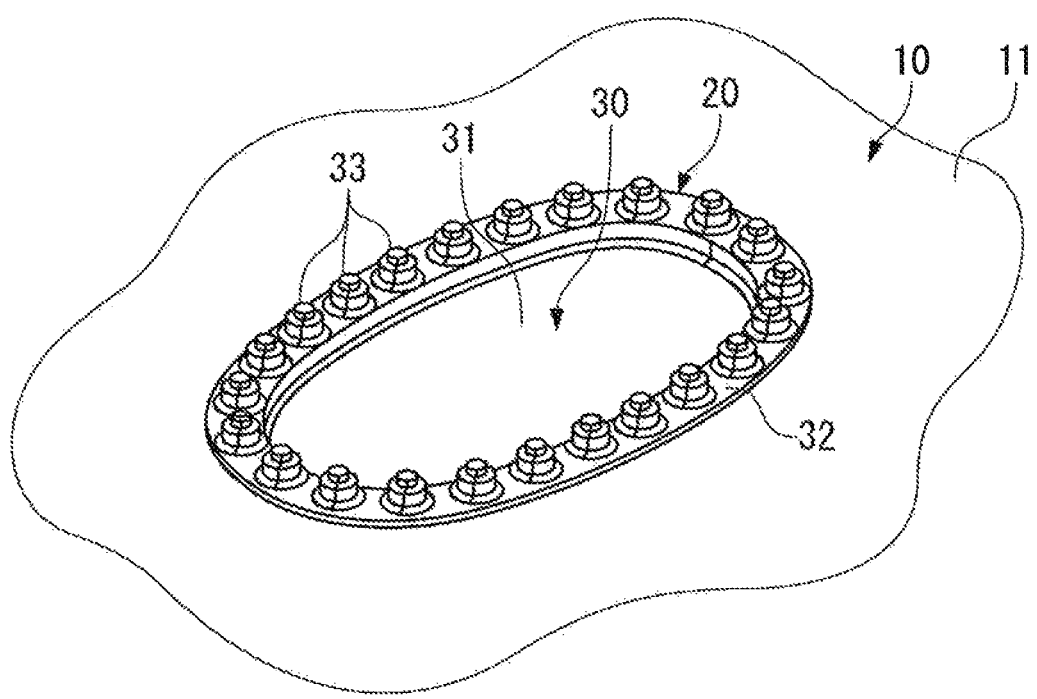
FIG. 1 is a perspective view illustrating an access door provided in a main wing of an aircraft in an embodiment.

FIG. 1 is a perspective view illustrating access door (closing member) 20 that is provided in a main wing 10 of an airframe of an aircraft, to which a closing member for an opening according to an embodiment is applied, when viewed from an inside of the main wing 10.

In order that a maintenance worker goes in and out of a fuel tank provided in an internal space of the main wing 10, the access door 20 is provided in a wing panel (panel) 11 that constitutes a surface on an upper side or a lower side of the main wing 10.

Figure 2:
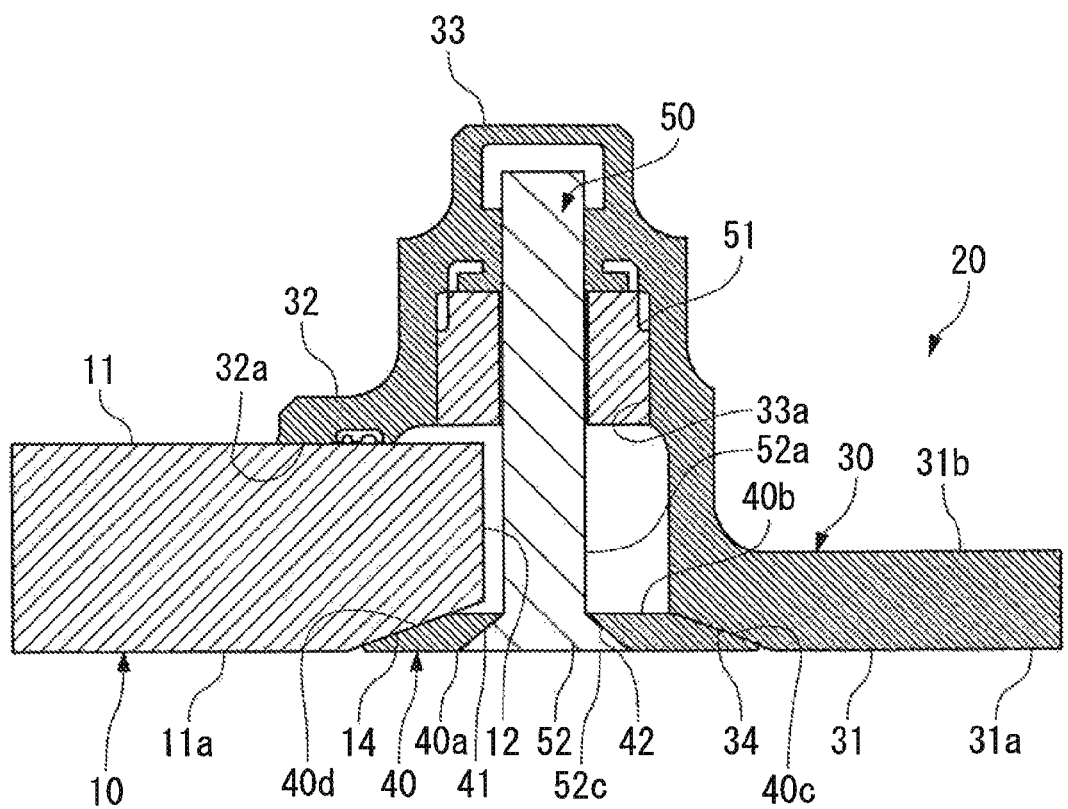
FIG. 2 is a sectional view illustrating an installation structure of the access door to a wing panel of the main wing.

As illustrated in FIG. 2, an opening 12 that communicates an inside and an outside of the main wing 10 to each other is formed in the wing panel 11. For example, the opening 12 has a proper shape such as an elongated circular shape, an elliptic shape, and a circular shape.

The access door 20 includes a door body (closing member body) 30 that is disposed on an internal space side of the main wing 10 with respect to the opening 12, a clamp ring (clamp member) 40 that is disposed on an external side of the main wing 10 with respect to the opening 12, and a fastener member (fastener) 50 that tightens the door body 30 and the clamp ring 40.

The door body 30 has an external dimension larger than that of the opening 12. The door body 30 includes a plate part 31 and a flange part 32. The plate part 31 includes an outer surface 31a that is formed flush with a wing outer surface 11a of the wing panel 11, and the plate part 31 has an external dimension smaller than that of the opening 12. The flange part 32 is integrally formed in an outer circumferential portion of the plate part 31, and the flange part 32 abuts on a surrounding area of the opening 12 on the internal space side of the main wing 10.

The flange part 32 includes an abutment surface 32a and a receiving part 33 for the fastener member 50. The abutment surface 32a abuts on the surrounding area of the opening 12 on the internal space side of the main wing 10. On the inside of the abutment surface 32a, the receiving part 33 is formed in a section facing the clamp ring 40.

Along a circumferential direction in the outer circumferential portion of the door body 30, the plural receiving parts 33 are provided according to positions in which the fastener members 50 are placed.

Each receiving part 33 is projected toward the internal space side of the main wing 10, and a recess 33a that is opened onto the side facing the clamp ring 40 is formed in the receiving part 33. A shank part 52a of the fastener body 52 constituting the fastener member 50 is accommodated in the recess 33a while a nut 51 constituting the fastener member 50 is retained in the recess 33a.

The ring-shaped clamp ring 40 has an outer diameter larger than an internal diameter of the opening 12 and an inner diameter smaller than the internal diameter of the opening 12. The clamp ring 40 has a quadrangular shape in section, an outer surface 40a that constitutes the outside of the main wing 10 is formed flush with the wing outer surface 11a of the wing panel 11, and an facing surface 40b facing the receiving part 33 of the door body 30 is formed in parallel to the outer surface 40a.

The clamp ring 40 includes a through-hole 41 that penetrates the outer surface 40a and the facing surface 40b in a position corresponding to the receiving part 33 of the door body 30. The shank part 52a of the fastener member 50 is inserted into each through-hole 41. In each through-hole 41, a tapered seating surface 42 in which a head part 52c of the fastener member 50 is accommodated is formed on the outer surface side of the main wing 10.

In the embodiment, the clamp ring 40 has a trapezoidal shape in section, and tapered surfaces 40c and 40d are formed between the outer surface 40a and the facing surface 40b. The tapered surfaces 40c and 40d are tilted such that a distance between the tapered surfaces 40c and 40d are gradually increased from the side of the facing surface 40b toward the side of the outer surface 40a.

An abutment surface 34 that abuts on the tapered surface 40c on an inner circumferential side of the clamp ring 40 is formed in the outer circumferential portion of the plate part 31. In the embodiment, the abutment surface 34 is formed while tilted at an angle corresponding to the tapered surface 40c of the clamp ring 40 such that an external diameter of the plate part 31 is gradually increased from the outer surface 31a toward the side of the inner surface 31b oriented toward the inside of the main wing 10.

An abutment surface 14 that abuts on the tapered surface 40d on an outer circumferential side of the clamp ring 40 is formed in the inner circumferential portion of the opening 12 of the wing panel 11. In the embodiment, the abutment surface 14 is formed while tilted at an angle corresponding to the tapered surface 40d of the clamp ring 40.

In the access door 20, an inner edge portion of the opening 12 is held between the clamp ring 40 and the abutment surface 32a of the flange part 32 of door body 30 in a state in which the opening 12 is closed. The fastener body 52 of the fastener member 50 is inserted into the through-hole 41 of the clamp ring 40 from the outside of the main wing 10, and the shank part 52a is screwed in the nut 51, thereby tightening the door body 30 and the clamp ring 40.

At this state, the abutment surface 14 of the opening 12 abuts on the tapered surface 40d of the clamp ring 40, and the tapered surface 40c of the clamp ring 40 abuts on the abutment surface 34 of the plate part 31 of the door body 30.

In the embodiment, in the door body 30, at least a side thereof that is to be located on an outward side of the airframe is made of one of a CFRP (composite material) including the carbon fiber, a titanium alloy, and a CRES (stainless alloy). In the case that the door body 30 is made of the composite material, an end portion of the conductive carbon fiber provided in a direction along the surface of the main wing 10 is exposed to the abutment surface 34 of the plate part 31 of the door body 30.

On the other hand, the clamp ring 40 is made of the CFRP (composite material) including the carbon fiber. The end portion of the conductive carbon fiber provided in the direction along the surface of the main wing 10 is exposed to the tapered surfaces 40c and 40d.

Figure 3:
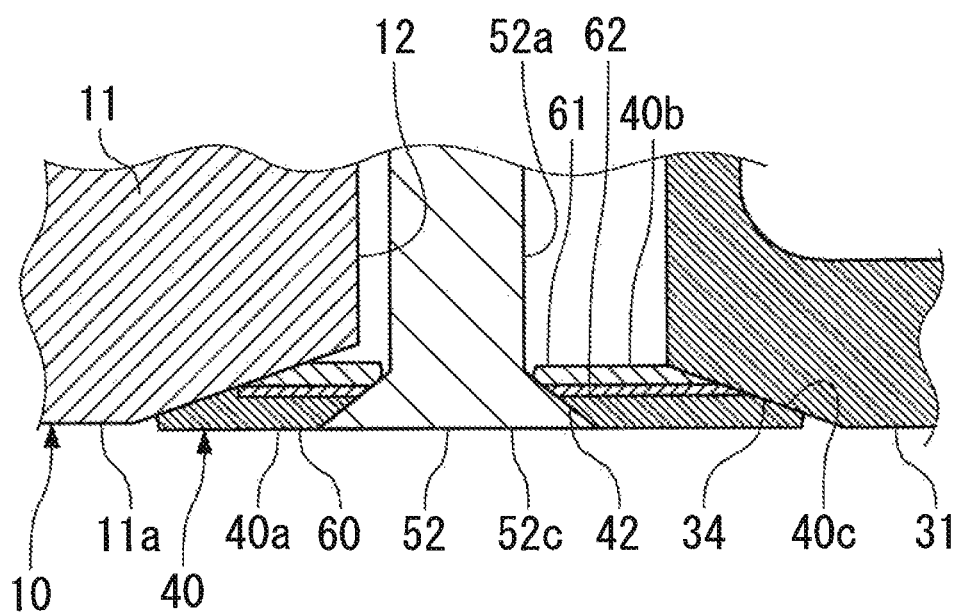
FIG. 3 is a sectional view illustrating another example of the installation structure of the access door to the wing panel of the main wing.

As illustrated in FIG. 3, the clamp ring 40 may have a hybrid structure, in which the outer surface 40a to be located on the outward of the main wing 10 is constructed by a composite material layer 60 made of the CFRP including the carbon fiber while the facing surface 40b facing the receiving part 33 of the door body 30 is constructed by a metallic material layer 61 made of an aluminum alloy or the like. The composite material layer 60 and the metallic material layer 61 are integrally joined by an adhesive agent 62 made of, for example, an insulating epoxy material, thereby forming a stacked structure.

In the composite material layer 60, an insulating film (not illustrated) is formed by curing a glass fiber reinforced plastic (insulating material) onto an adhesive surface side of the adhesive agent 62.

In the metallic material layer 61, an insulating film (not illustrated) is formed by coating the adhesive surface side of the adhesive agent 62 with the insulating material.

The insulating layer can be formed by the insulating film of the composite material layer 60, the adhesive agent 62, and the insulating film of the metallic material layer 61.

Because the tapered surfaces 40c and 40d of the clamp ring 40 are the tilt surface, the end portion of the conductive carbon fiber, which is provided in the direction along the surface of the main wing 10 to constitute the whole of the clamp ring 40 (in the case of the configuration of FIG. 2) or the composite material layer 60 (in the case of the configuration of FIG. 3), is exposed to the tapered surfaces 40c and 40d.

The end portion of the conductive carbon fiber, which is provided in the direction along the surface of the main wing 10 to constitute the wing panel 11, is also exposed to the abutment surface 14 of the opening 12 of the main wing 10.

In the above configuration, the door body 30, the clamp ring 40, and the opening 12 of the wing panel 11 are electrically connected by surface bonding between the conductive materials in a butt section of the abutment surface 34 of the door body 30 and the tapered surface 40c of the clamp ring 40 and a butt section of the tapered surface 40d of the clamp ring 40 and the abutment surface 14 of the opening 12. Therefore, even if the lightning strikes the door body 30, the current diffuses from the door body 30 to the wing panel 11 through the clamp ring 40, so that the lightning protection capability can be improved.

For example, it is assumed that the abutment surface 34 of the door body 30, the tapered surfaces 40c and 40d of the clamp ring 40, and the abutment surface 14 of the opening 12 are oriented normal to the direction in which the door body 30 and the clamp ring 40 are attached and detached, namely, on a plane parallel to the surfaces of the door body 30 or the wing panel 11. In this case, possibly the end portion of the carbon fiber, which is exposed to these surfaces, is frictioned and loosened after the door body 30 and the clamp ring 40 are repeatedly attached and detached. On the other hand, in the embodiment, these surfaces are constructed by the tapered surfaces, whereby the carbon fiber can be prevented from being loosened.

Because of the surface contact between the tapered surfaces, a large amount of cut surface of the carbon fiber is exposed to the tapered surface 40d of the clamp ring 40 and the abutment surface 14 of the opening 12. Therefore, a contact area between the carbon fibers of the tapered surface 40d of the clamp ring 40 and the abutment surface 14 of the opening 12 is enlarged, and the tapered surface 40d of the clamp ring 40 and the abutment surface 14 of the opening 12 can securely be brought into contact with each other to ensure the electric conduction.

In the embodiment, the door body 30 and the clamp ring 40 are described. There is no particular limitation to the tightening structure and the shapes or the like of the door body 30 and the clamp ring 40, but any other configuration may be adopted as appropriate.

Without departing from the scope of the invention, the configurations described in the embodiment can be appropriately selected or changed to another configuration.

REFERENCE SIGNS LIST 10 main wing
11 wing panel (panel)
12 opening
14 abutment surface
20 access door (closing member)
30 door body (closing member body)
31 plate part
31a outer surface
31b inner surface
32 flange part
33 receiving part
34 abutment surface
40 clamp ring (clamp member)
40a outer surface
40b facing surface
40c tapered surface
40d tapered surface
41 through-hole
50 fastener member (fastener)
60 composite material layer
61 metallic material layer
62 adhesive agent

The invention claimed is:

1. A closing member for an opening that is formed in a panel constituting an outer surface of an airframe of an aircraft and being made of a composite material including a carbon fiber, the closing member comprising:

a closing member body configured to be disposed on one surface side of the panel to close the opening such that at least a side thereof faces and is exposed to an exterior of the airframe, the closing member body being made of one of titanium alloy, a stainless alloy, and a composite material including a carbon fiber, the closing member body having an external diameter larger than that of the opening;

a ring-shaped clamp member configured to be disposed on the other surface side of the panel such that at least a surface side of the clamp member faces an exterior of the airframe, the clamp member being made of the composite material including the carbon fiber, the clamp member having an external diameter larger than that of the opening; and a fastener configured to tighten the closing member body and the clamp member while the panel is held between an outer circumferential portion of the closing member body and an outer circumferential portion of the clamp member, wherein the closing member body and the clamp member are configured to be disposed such that the closing member body and an inner circumferential portion of the clamp member abut on each other, and the outer circumferential portion of the clamp member and an inner edge portion of the opening abut on each other, whereby the closing member is electrically connected to the panel through the clamp member.

2. The closing member for an opening according to claim 1, wherein an abutment surface of the closing member body and the inner circumferential portion of the clamp member and an abutment surface of the outer circumferential portion of the clamp member and the inner edge portion of the opening constitute a tapered surface that is configured to be tilted with respect to a direction orthogonal to the airframe surface when the clamp member and the closing member body are disposed.

3. The closing member for an opening according to claim 1, wherein, in the clamp member, the surface that is to be located on the outward of the airframe is made of the composite material including the carbon fiber while a surface facing an inward of the airframe is made of a metallic material.

4. The closing member for an opening according to claim 3, wherein the metallic material is an aluminum alloy.

5. The closing member for an opening according to claim 3, wherein the clamp member comprises a first layer made of the composite material, a second layer made of the metallic material, and an insulating layer provided between the first layer and the second layer.

6. The closing member for an opening according to claim 5, wherein the first layer and the second layer are integrally joined by an adhesive agent.

7. An aircraft comprising the closing member according to claim 1.

8. The aircraft according to claim 7, wherein the opening is provided in a main wing constituting the airframe, and the opening is an access to a fuel tank accommodated in the main wing.

* * * * *

UNITED STATES PATENT AND TRADEMARK OFFICE
CERTIFICATE OF CORRECTION

PATENT NO. : 8,752,792 B2  
APPLICATION NO. : 13/577754  
DATED : June 17, 2014  
INVENTOR(S) : Hideto Motohashi Page 1 of 1

It is certified that error appears in the above-identified patent and that said Letters Patent is hereby corrected as shown below:

On the Title page Item (73) Assignee section, please delete "Mitubishi" and insert --Mitsubishi--

Signed and Sealed this  
Sixth Day of January, 2015

Michelle K. Lee  
*Deputy Director of the United States Patent and Trademark Office*